United States Patent [19]

Turney

[11] Patent Number: 5,615,236
[45] Date of Patent: Mar. 25, 1997

[54] METHOD AND APPARATUS FOR DIRECT RE-ACQUISITION OF PRECISION-CODE AFTER A SHORT POWER INTERRUPTION

[75] Inventor: Paul F. Turney, Santa Clara, Calif.

[73] Assignee: Trimble Navigation Limited, Sunnyvale, Calif.

[21] Appl. No.: 412,554

[22] Filed: Mar. 29, 1995

[51] Int. Cl.⁶ .......................................................... H04L 7/00
[52] U.S. Cl. ............................ 375/365; 375/357; 342/357; 455/13.2
[58] Field of Search ...................................... 375/200, 208, 375/357, 365–367; 455/13.2, 51.1, 51.2; 342/104, 107, 108, 118, 342, 357, 358

[56] References Cited

U.S. PATENT DOCUMENTS 5,177,490  1/1993  Ando et al. ............................ 342/357
5,323,164  6/1994  Endo ....................................... 342/357

*Primary Examiner*—Tesfaldet Bocure
*Assistant Examiner*—Bryan Webster
*Attorney, Agent, or Firm*—Thomas E. Schatzel; Law Offices of Thomas E. Schatzel a prof. Corporation

[57] ABSTRACT

An improved single or dual-frequency navigation satellite receiver that can directly re-acquire P-code code-phase after a brief loss of P-code tracking. A digital signal processor (DSP) writes its current position fixes to a non-volatile memory. The DSP also updates a clock that keeps a running estimate of precise global positioning system time. When P-code code-phase is lost, it is re-acquired by reading the clock back in, adjusting for its drift, reading in the last position fix from the non-volatile memory, and then beginning an advanced P-code code-phase search based on such head start information.

5 Claims, 2 Drawing Sheets

5,615,236

METHOD AND APPARATUS FOR DIRECT RE-ACQUISITION OF PRECISION-CODE AFTER A SHORT POWER INTERRUPTION

BACKGROUND OF THE INVENTION

1. Field of the Invention

The invention relates generally to radio communication and more specifically to navigation receivers that operate with signals received from orbiting navigation satellites.

2. Description of the Prior Art

The global positioning system (GPS) supported by the United States government enables satellite navigation for military and civilian users alike. Two codes, a coarse-grained acquisition code (C/A-code) and a fine-grained precision code (P-code) are transmitted on two L-band microwave frequencies and each provide ranging and GPS-system time information. The C/A-code is available to civilian users and the P-code is normally available only to authorized users. During certain periods, the P-code is encrypted and such encrypted P-code is referred to as Y-code. The C/A-code is a digital sequence that repeats each millisecond and is unique to one of two dozen satellites. The P-code is a digital sequence that has a period of 269 days, with one week long segments of it transmitted intact. A single week-long segment is $10.23 \times 10^6 \times 604800$ bits long, which comes from the P-code transmission rate of 10.23 MHz times the exact number of seconds in seven whole days. So a code phase uncertainty of even ±1 second can call for a search through 20,460,000 code chips.

Not knowing the exact global positioning system time is not an insurmountable problem in acquiring the code phase of the C/A-code, because a code generator in a GPS receiver can be slipped through all 1023 chips of the C/A-code in half-chip increments, and thereby discover the code phase in just a few seconds. Acquiring the P-code without knowing the precise global positioning system time is practically impossible. An external source of precise time, for example, coordinated universal time (UTC), is usually not available. The GPS satellite system time must be known to within much less than one millisecond, so the resulting code phase uncertainty is too great. A code-phase search can thus require searching through millions of chips for a match.

Therefore, authorized users tend to get to P-code code-phase acquisition and lock by first acquiring the code phase and then the global positioning system time available in the C/A-code. With knowledge of the global positioning system time, the P-code code-phase uncertainty is reduced to just a few chips.

The long length of the P-code provides so much processing gain in the associated correlators that the L1 or L2 carrier which carries the P-code is relatively hard to jam. The C/A-code on an L1 carrier is easy to jam, and since the codes transmitted are well-known, spoofing of the satellite transmissions is easy.

An authorized receiver that has been tracking P-code is handicapped, or totally prevented from re-acquiring the P-code if it loses its power supply in an uncontrolled manner, e.g., a battery goes dead or is unplugged, and the C/A-code on L1 is effectively being spoofed or jammed. Authorized receivers that are turned-off can go through a more graceful procedure wherein they save important data, e.g., global positioning system time and position.

SUMMARY OF THE PRESENT INVENTION

It is therefore an object of the present invention to provide an authorized navigation satellite receiver for directly re-acquiring P-code after a brief loss of P-code lock without depending first on the acquisition of the C/A-code to synchronize to satellite system time.

It is a further object of the present invention to provide a navigation satellite receiver that resists spoofing and other hostile efforts to disable its operation.

It is another object of the present invention to provide a navigation satellite receiver that provides high quality measurements on signals from navigation satellites.

It is a still further object of the present invention to provide embodiments of authorized navigation satellite receivers for directly re-acquiring P-code after a brief loss battery power without depending first on the acquisition of the C/A-code to synchronize to satellite system time.

Briefly, an embodiment of the present invention comprises an improved single or dual-frequency navigation satellite receiver that can directly re-acquire P-code code-phase after a brief loss of P-code tracking. A digital signal processor (DSP) writes its current position fixes to a non-volatile memory. The DSP also updates a clock that keeps a running estimate going of precise global positioning system time. The updates occur each second. When P-code code-phase or lock is lost following a prime-power interruption, it is re-acquired by reading the clock back in, adjusting for its drift, reading in the last position fix from the non-volatile memory, and then beginning an advanced P-code code-phase search based on such head start information.

An advantage of the present invention is that a portable handheld battery-powered navigation satellite receiver is provided that can directly re-acquire P-code after a brief loss of power caused by the main battery failing or being replaced.

Another advantage of the present invention is that a navigation satellite receiver is provided that can directly re-acquire P-code after a brief loss of power without depending first on the acquisition of the C/A-code to synchronize to satellite system time, and thus continue to operate during periods of severe C/A-code spoofing or jamming.

Still another advantage of the present invention is that a method is provided for re-acquiring P-code code-phase lock that does not depend on first locking onto C/A-code.

A further advantage of embodiments of the present invention is that a navigation satellite receiver is provided for high quality measurements on signals from navigation satellites.

A still further advantage of the present invention is that a method is provided for a C/A-code navigation satellite receiver to more rapidly acquire satellite tracking after a brief power loss.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
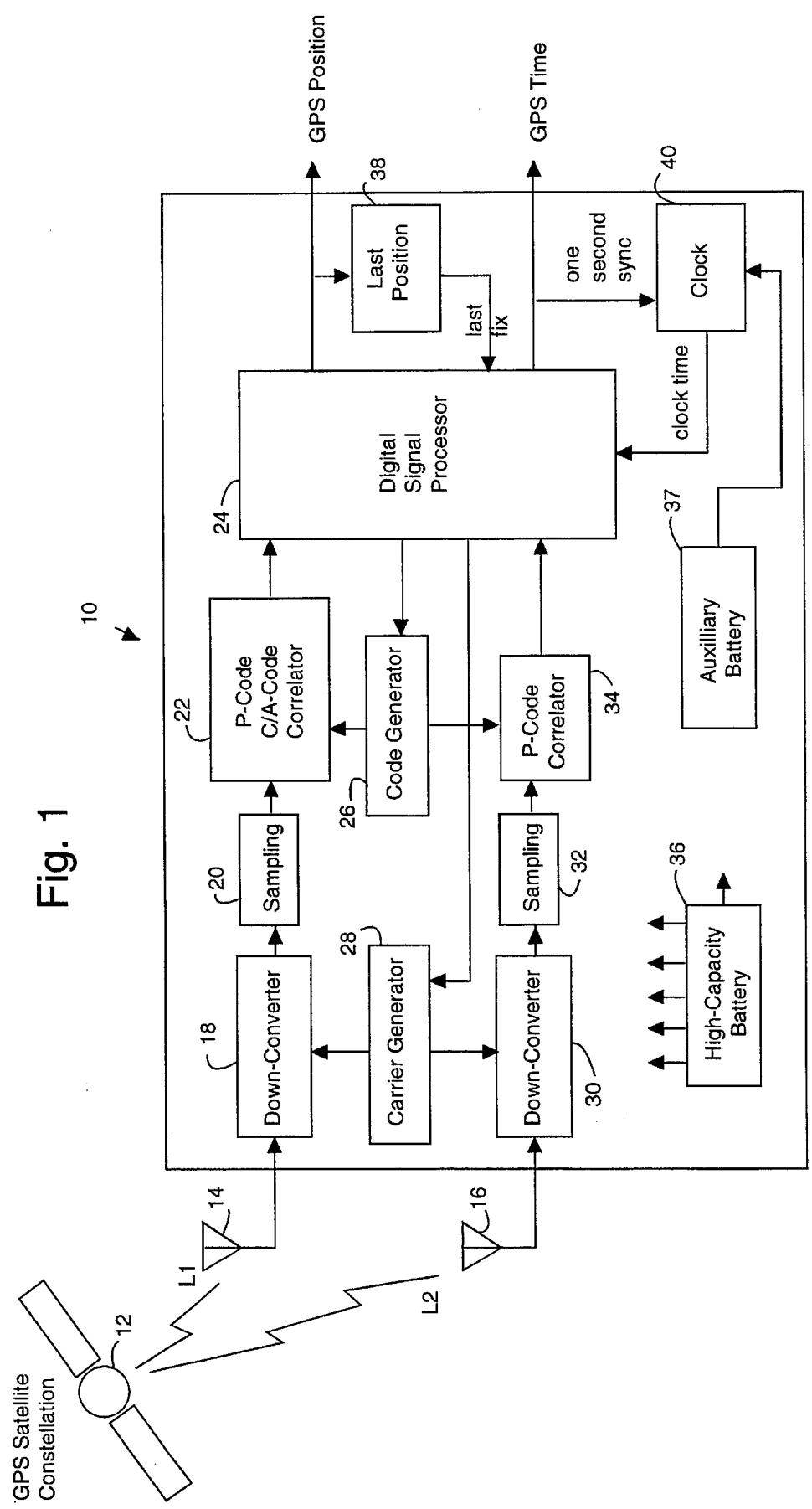
FIG. 1 is a block diagram of a dual-frequency navigation satellite receiver embodiment of the present invention.

FIG. 1 illustrates an authorized dual-frequency portable handheld navigation satellite receiver embodiment of the present invention, referred to by the general reference numeral 10. For example, the receiver 10 operates with L-band microwave radio signals transmitted from orbiting constellations of global positioning system (GPS) satellites represented by a satellite 12. A conventional GPS receiver is described in U.S. Pat. No. 4,847,862, issued Jul. 11, 1989, which is incorporated herein by reference.

Satellites 12 transmit two carrier frequencies, L1 and L2, at 1575.42 MHz and 1227.6 MHz respectively, that are received by a pair of antennas 14 and 16. A super-heterodyne downconverter 18 converts the radio frequency (RF) of L1 to an intermediate frequency (IF) that is sampled in phase and in quadrature by a sampler 20. A correlator 22 despreads the direct sequence spread spectrum (DSSS) modulation for input to a digital signal processor (DSP) 24. Such modulation conventionally comprises coarse-grained acquisition code (C/A-code) and/or precision code (P-code). The DSP 24 provides code and code phase information to a code generator 26. Carrier and carrier phase information are provided by the DSP 24 to a carrier generator 28. Another super-heterodyne downconverter 30 converts the radio frequency (RF) of L2 to an intermediate frequency (IF) that is sampled in phase and in quadrature by a sampler 32. A precision code (P-code) correlator 34 despreads the direct sequence spread spectrum (DSSS) modulation for the DSP 24. If the P-code on L2 is encrypted, the DSP 24 provides Y-code and Y-code phase information to the code generator 26. The DSP 24 includes a conventional computer-implemented method for determining where in the P-code or Y-code sequence it should phase its code generation information, according to global positioning system time. Both global positioning system time and GPS-determined position fixes are output by the DSP 24 for a user. An essential power source or medium-to-high capacity replaceable and rechargeable battery 36 powers the receiver 10. An auxiliary battery 37 provides power to critical circuits, e.g., while the battery 36 is being replaced or turned off. Conventional technologies and techniques can be commercially-obtained to construct the receiver 10 described to this point.

Alternatively, a conventional single-frequency GPS receiver may be substituted for the dual-frequency receiver 10.

An improvement on the receiver 10 comprises a memory 38 for storing position fixes each time one is output by the DSP 24 in a non-volatile memory, e.g., in flash EEPROM or in a normal RAM with battery back-up from a low-capacity auxiliary power source. A free-running clock 40 operates on power provided at least by the auxiliary battery 37 and receives periodic synchronizing data from the DSP 24 related to GPS satellite system time. The clock 40 maintains a running estimate of global positioning system time and any drift errors are corrected with the synchronizing data each second. The clock 40 has unavoidable and unknown drifts associated with its running time estimate is tethered-in by the periodic updating with GPS satellite system time. Such running time estimate is always available to the DSP 24 and can be relied upon to be very close to the exact GPS satellite system time.

Figure 2:
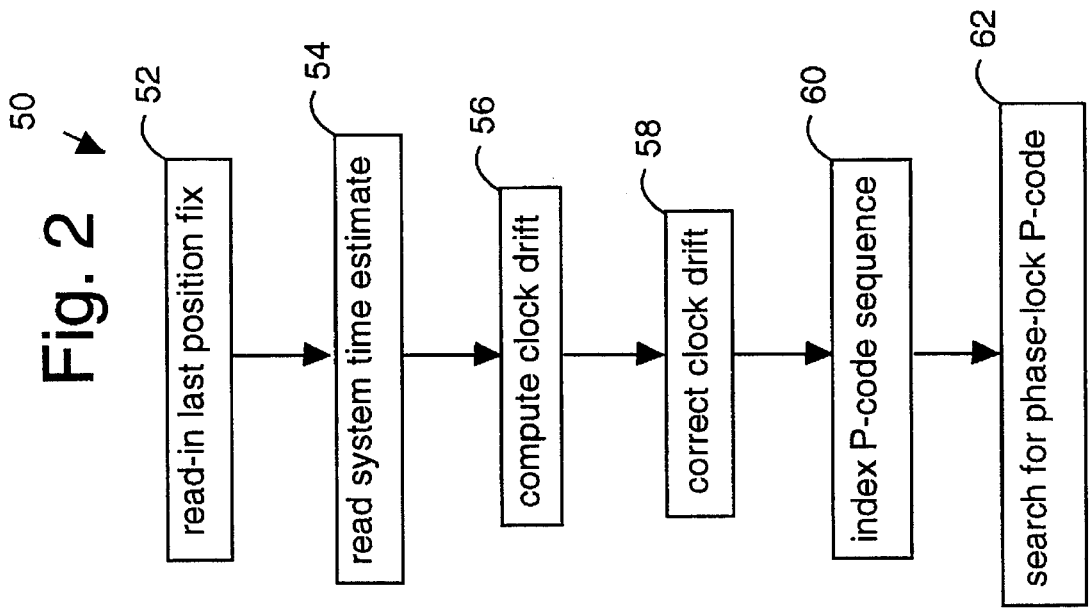
FIG. 2 is a flow chart of a computer-implemented process for a digital signal processor of the receiver of FIG. 1.

FIG. 2 illustrates a computer-implemented process 50 that is included in the DSP 24 for directly re-acquiring P-code code-phase lock, e.g., after a brief power outage as would occur when external power is removed or when the battery 36 dies and/or is exchanged for a fresh one. A step 52 reads-in a last position fix from the memory 38. A step 54 reads in an estimate of the global positioning system time from the clock 40. A step 56 determines the drift of the clock 40 by comparing readings from it to readings from a more accurate clock that is conventionally intrinsic to GPS-DSPs. A step 58 adjusts the last reading of the clock 40 by a drift correction factor and produces an enhanced estimate of the true current global positioning system time. A step 60 indexes into a version of the P-code which it stores or computes, at a point that is expected to be correct for the global positioning system time estimated at a position indicated by the last position fix read from the memory 38. The generation and searching through the P-code is otherwise conventional. In a step 62, the DSP 24 causes the code generator 26 to slip the code around until a P-code code-phase lock is obtained, as indicated by P-code correlator 34.

Figure 3:
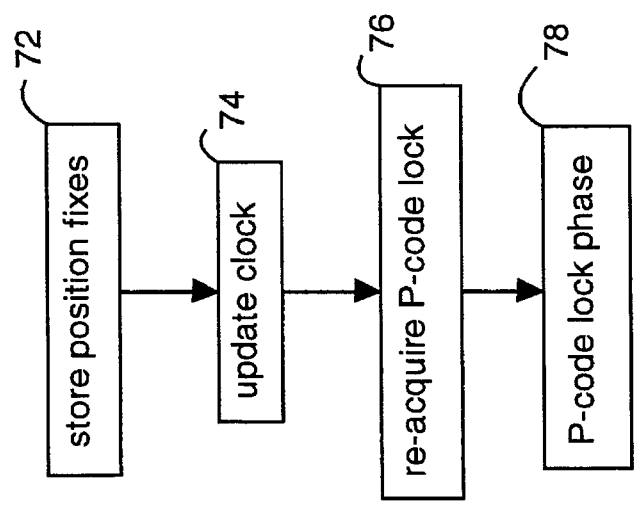
FIG. 3 is a flow chart of a method embodiment of the present invention for re-acquiring P-code code-phase lock after being lost for a short time without first establishing a C/A-code lock.

FIG. 3 illustrates a method 70 for directly re-acquiring precision-code (P-code) code phase in a global position system (GPS) receiver after a brief loss of P-code tracking. The method 70 comprises a step 72 for periodically storing a position fix in a non-volatile memory while tracking P-code transmissions from a GPS satellite. A step 74 is for periodically updating a clock to synchronize it with global positioning system time while tracking the P-code transmissions from the GPS satellites. A step 76 is for re-acquiring a P-code code-phase lock to the GPS satellites by reading the non-volatile memory to obtain information about the receiver's position, and by reading an estimate of the global positioning system time from the clock, and by using the position and time information to index into the P-code code for a starting point in a P-code code-phase search. A step 78 then code-phase locks onto the P-code when a correlation is detected.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for directly re-acquiring precision-code (P-code) code phase in a global position system (GPS) receiver after a brief loss of primary-power supply affecting code tracking, the method comprising the steps of:

periodically storing a position fix in a non-volatile memory while tracking P-code transmissions from GPS satellites;

periodically updating a clock to synchronize it with global positioning system time while tracking said P-code transmissions from said GPS satellites; and re-acquiring a P-code code-phase lock to said GPS satellites by reading said non-volatile memory to obtain information about said receiver's position and by reading an estimate of said global positioning system time from said clock and by using said position and time information to index into said P-code for a starting point in a P-code code-phase search then code-phase locking onto said P-code when a correlation is detected.

2. A computer-implemented process for execution by a digital signal processor (DSP) in a dual-frequency navigation satellite receiver for directly re-acquiring precision-code (P-code) code-phase lock after losing lock, the process comprising the steps of: